United States Patent
Liang et al.

(10) Patent No.: US 6,954,616 B2
(45) Date of Patent: Oct. 11, 2005

(54) TOP-LEVEL CONTROLLER FOR WIRELESS COMMUNICATION DEVICES AND PROTOCOLS

(75) Inventors: Ping Liang, Irvine, CA (US); Minghua Chen, Irvine, CA (US)

(73) Assignee: Transdimension, Inc., Irvine, CA (US)

( * ) Notice: Subject to any disclaimer, the term of this patent is extended or adjusted under 35 U.S.C. 154(b) by 497 days.

(21) Appl. No.: 10/106,515

(22) Filed: Mar. 22, 2002

(65) Prior Publication Data

US 2002/0173272 A1 Nov. 21, 2002

Related U.S. Application Data

(60) Provisional application No. 60/278,458, filed on Mar. 22, 2001.

(51) Int. Cl.[7] ................................................. H04B 1/10
(52) U.S. Cl. ..................... 455/63.1; 455/63.2; 455/41.2; 455/67.13; 455/114.2; 375/132; 375/202
(58) Field of Search ............................... 455/63.1, 63.2, 455/41.2, 62, 67.13, 114.2; 375/132, 202

(56) References Cited

U.S. PATENT DOCUMENTS

| | | | | |
|---|---|---|---|---|
| 5,042,083 A | * | 8/1991 | Ichikawa | ..................... 455/517 |
| 6,775,258 B1 | * | 8/2004 | van Valkenburg et al. | .. 370/338 |
| 2003/0054827 A1 | * | 3/2003 | Schmidl et al. | ............. 455/450 |

* cited by examiner

*Primary Examiner*—Lee Nguyen
*Assistant Examiner*—Minh D. Dao
(74) *Attorney, Agent, or Firm*—Knobbe, Martens, Olson & Bear, LLP.

(57) ABSTRACT

Wireless communication networks utilize various communication protocols to exchange data between wireless network devices. Overlapping communication frequencies between data exchange protocols present a collision and interference problem when data transmissions are transmitted using similar timing and frequency characteristics during wireless transit. A device and various network configurations for monitoring, moderating, and/or coordinating wireless transmission traffic in a wireless communication network where overlapping communication frequencies coexist is described to significantly reduce or avoid interference caused by signal collisions.

6 Claims, 8 Drawing Sheets

TOP-LEVEL CONTROLLER FOR WIRELESS COMMUNICATION DEVICES AND PROTOCOLS

CLAIM OF PRIORITY

This U.S. patent application claims priority to U.S. Provisional Patent Application No. 60/278,458, entitled "Collision Avoidance In Wireless Communication Devices" filed Mar. 22, 2001 which is hereby incorporated by reference. Additionally, this application incorporates by reference the following co-pending applications: Ser. No. 10/003,703 entitled "Coordination Architecture For Wireless Communication Devices Using Multiple Protocols", Ser. No. 10/053,860 entitled "Collision Rectifica IN Wireless Communication Devices", Ser. No. 10/066,284 entitled "Centralized Coordination Point For Wireless Communication Devices Using Multiple Protocols", Ser. No. 60/328,882 entitled "Recognition Scheme For Moderating Wireless Protocols", Ser. No. 60/336,339 entitled "Remotely-Cooperative Scheduling Solution For Moderating Wireless Protocols", Ser. No. 60/367,664 entitled "Recognition Scheme For Moderating Wireless Protocols", and Ser. No. 60/367,663 entitled "Remotely-Cooperative Scheduling Solution For Moderating Wireless Protocols".

BACKGROUND OF THE INVENTION

1. Field of the Invention

The present invention relates to wireless networking systems and, in particular, to a coexistive solution for frequency overlapping wireless communication protocols.

2. Description of the Related Art

Wireless communication and networking protocols are increasingly used to provide connectivity for diverse classes of electronic devices. These wireless protocols permit electronic devices such as computers, personal digital assistants (PDA), and mobile phones to transmit and receive information without the requirement of physically interconnecting the electronic devices to one another or to communications mediums via wire or cable connections. Wireless connectivity in this manner increases portability and flexibility in electronic devices and has become an important method by which data and information is distributed.

Numerous standards have been proposed for use in transmitting and receiving information in wireless local area networks. Two emerging protocols, which have received widespread acceptance, include Bluetooth (BT) and IEEE 802.11 (WLAN) wireless protocols. These protocols share a common frequency spectrum in the 2.4-GHz Industrial, Scientific, and Medical (ISM) band and are used to exchange information between electronic devices which support the appropriate protocol. Both protocols offer high-speed data exchange rates and may be integrated into devices for connecting to land-based or wired communications networks such as the Internet. In general, wireless protocols, such as BT and WLAN, transmit data by superimposing the desired information on a carrier radio wave. Data is recovered through the use of a receiver that specifically tunes to the transmission frequency of the carrier signal to receive the signal and decode the information contained therein.

The Bluetooth protocol is designed primarily for short-range wireless communication between electronic devices in small, localized networks (piconets). The network topology in the Bluetooth piconet comprises up to eight active devices, with a maximum of three synchronous-connection-oriented (SCO) links. These SCO links further support real-time communications such as those required for voice or telephony applications. The Bluetooth protocol additionally supports asynchronous connection links (ACL) which are typically used to exchange data and information in non-time critical applications. Within the piconet topology, only one Bluetooth device may typically transmit at a time, and transmissions are managed using a master/slave relationship. One Bluetooth device is designated as a master device and controls other slave device transmissions within the piconet. The master device coordinates transmissions within the piconet by continually polling the slave devices to determine which slave devices require a clear channel to transmit data. Slave devices receive "permission" from the master device before transmitting information and only transmit information when "asked" to do so by the master device. Controlling slave transmission traffic in this manner permits the master device to schedule and manage information exchange within the piconet and prevents data collisions and corruption due to overlapping data transmissions from multiple devices.

Bluetooth device communication can be further characterized by the use of a frequency-hopping spread spectrum (FHSS) technique. With the FHSS technique, data is transmitted in discrete packets along different frequencies within the 2.4-GHz ISM band. The Bluetooth protocol specifies that frequency hops be made at the rate of approximately 1600 hops/sec such that data exchange takes place with the data spread throughout the ISM band. This type of spread spectrum (SS) technique utilizes a relatively high-energy transmission along a narrow band for a limited time.

Alternatively, the WLAN wireless protocols may be used to connect electronic devices in a peer-to-peer network. With the peer-to-peer type of network, there are no strict servers or hierarchy among communicating devices. In this network topology, each electronic device within the wireless network functions as its own server and determines when to send and receive information without a dedicated administrative server or master device. Devices in the WLAN wireless network access the available radio frequencies and bandwidth using a sensing and collision avoidance protocol to improve the rate of data and information transmission.

WLAN device communication can be further characterized by the use of a direct-sequence spread spectrum (DSSS). In a DSSS communication environment, data is transmitted along a wide bandwidth with relatively low energy. Typically, DSSS divides the available ISM band into eleven to fourteen sub-channels for different countries over the world. Each DSSS network will use a band of several channels centered at one of these standard sub-channels. In a multiple access-area network, overlapping and/or adjacent areas using different channels can operate simultaneously without interference if the distance between the center frequencies is at least 30 MHz. WLAN protocols occupy these fixed channels of the ISM band, passbands), to transmit and receive information between compatible devices.

While the aforementioned wireless protocols function well in environments where only one wireless protocol in the ISM band is in operation, a problem arises in local area networks where Bluetooth and WLAN devices coexist. The shared frequency range of the two protocols inevitably results in transmission interference and data corruption as the two protocols operate with transmission frequencies that overlap at various times during routine transmission of information. The resulting frequency overlap degrades the network performance and transmission rates in both families of devices due to a lack of ability of wireless devices, which use differing protocols to coordinate their data transmissions. This problem is exacerbated as the number of wireless devices within the network increases and is further affected by the proximity in which the wireless devices are placed with respect to one another. Thus, in order to prevent undue network performance degradation, a compensation scheme must be devised to facilitate the coexistence of shared frequency network topologies such as those used by BT and WLAN protocols.

The widespread acceptance of both the Bluetooth and WLAN wireless protocols has further lead to the manufacture of a large number of electronic devices which typically incorporate only a single wireless technology or protocol for network communication. This creates an additional problem, as there are many existing wireless networks that necessarily dictate the type of wireless protocol that can be used within the network or in the vicinity of those devices in the network. Wireless devices, which do not comply with the protocol of the existing wireless network, may be incompatible with the network and may be precluded from use. Thus, a user may be denied access to wireless devices that cannot be integrated into the existing wireless network infrastructure because of conflicting wireless standards. In the absence of a unifying device which permits the use of more than one wireless standard in the same service area, existing wireless devices in the network may be required to be replaced with updated devices which are capable of communicating using multiple wireless standards to prevent timing and data collisions. Clearly, device replacement in this manner is undesirable as it may be prohibitively expensive and precludes the use of wireless devices that operate with differing frequency-overlapping protocols.

Currently, coexistive methods and mechanisms are difficult to implement due to the requirement of using a wired backbone device or a dual mode radio with a special protocol. Additionally, interference and transmission collision between frequency competing protocols can be significant, and, therefore, coexistive systems are not easily implemented in current wireless local area networks that utilize a plurality of protocols. For example, a current collision avoidance method reduces collision interference by isolating competing protocols into separately designated access areas. Although isolating frequency-overlapping protocols may reduce collision interference, the convenience of using the wireless network access area is diminished due to loss of flexibility in maintaining a mixed protocol network.

Based on the foregoing, a need exists for a system to facilitate the coexistence of wireless devices that operate with different frequency-overlapping protocols such as the Bluetooth and WLAN wireless protocols. A desirable feature of such a system is to permit the use of existing wireless devices without substantial modification or retrofit. Furthermore, this system should manage cross-protocol trafficking to reduce collisions and interference between the wireless protocols using mixed topologies so as to permit wireless devices with differing protocols to function within the same transmission area.

SUMMARY OF THE INVENTION

The aforementioned needs are satisfied by a system, device, and method for moderating frequency-overlapping wireless communication protocols with an add-in control point in a manner as described herein below. In one embodiment, a communications system for a wireless network having a first access area with a first plurality of wireless communication devices and a second access area with a second plurality of wireless communication devices is disclosed, wherein the system comprises an interference region and an add-in control point. The interference region is a region in the wireless network where the first access area overlaps the second access area, and wherein the first plurality of wireless communication devices that exchange communication signals using a first frequency-overlapping protocol coexist with the second plurality of wireless communication devices that exchange communication signals using a second frequency-overlapping protocol. The add-in control point is positioned within the wireless network, wherein the add-in control point monitors and coordinates the exchange of communication signals between the first and second frequency-overlapping protocols to reduce collisions between the communication signals derived from the first and second frequency-overlapping protocols.

In one aspect, the add-in control point analyzes the timing statistics of the communication signals to identify each type of frequency-overlapping protocol in use and determines a quality of service parameter for each type of frequency-overlapping protocol used. In addition, the first frequency-overlapping protocol may comprise a frequency-hopping spread spectrum protocol, wherein the frequency hopping spread spectrum protocol may comprise a Bluetooth protocol, and wherein the first or second access area comprises a Bluetooth piconet. Moreover, the first or second frequency-overlapping protocol may comprise a direct-sequence spread spectrum protocol, wherein the direct-sequence spread spectrum protocol is a wireless local area network (WLAN) protocol or an IEEE 802.11B protocol, and wherein the second access area comprises a WLAN access area.

In another aspect, the add-in control point is connected to a backbone network, wherein the add-in control point comprises an access control point that is connected to the backbone network. The access control point permits the add-in control point to manage the exchange of communication signals between the first and second plurality of wireless communication devices and the backbone network. The backbone network may comprise land-based networks including Ethernet, Internet, digital subscriber line, dial-up, or plane telephone networks.

The system may further comprise a first access point, and wherein the first plurality of wireless communication devices interact with the first access point to exchange communication signals with the backbone network. The first access point is connected to the add-in control point and exchanges communication signals with the backbone network via the add-in control point. The first plurality of wireless communication devices interact with the first access point to exchange communication signals with the backbone network via the add-in control point.

In addition, the system may further comprise a second access point, and wherein the second plurality of wireless communication devices interact with the second access point to exchange communication signals with the backbone network. The second access point is connected to the add-in control point and exchanges communication signals with the backbone network via the add-in control point. The second plurality of wireless communication devices interact with the second access point to exchange communication signals with the backbone network via the add-in control point.

In another aspect, the first and second access areas may partially overlap to form the interference region, and/or the first and second access areas may wholly overlap to form the interference region. The first access area comprises a first reception radius that encloses the first plurality of wireless communication devices. The second access area comprises a second reception radius that encloses the second plurality of wireless communication devices.

In another embodiment, a communications system in a wireless network having a first access area and a second access area is disclosed. The system may comprise a first plurality of wireless communication devices positioned within the first access area, wherein the first plurality of wireless communication devices exchange information by transceiving a first plurality of frequency-overlapping wireless communication signals. The system may further comprise a second plurality of wireless communication devices positioned within the second access area, wherein the second plurality of wireless communication devices exchange information by transceiving a second plurality of frequency-overlapping wireless communication signals.

The system may still further comprise an overlapping area in the wireless network, wherein the first and second access areas overlap, and wherein the first plurality of frequency-overlapping wireless communication signals derived from the first plurality of communication devices using the first protocol coexist with the second plurality of frequency-overlapping wireless communication signals derived from the second plurality of communication devices using the second protocol. The system may still further comprise a collision avoidance device positioned in the wireless network, wherein the collision avoidance device monitors the first and second plurality of frequency-overlapping wireless communication signals and coordinates the exchange of the first and second plurality of frequency-overlapping wireless communication signals to reduce the occurrence of collisions between the first and second plurality of frequency-overlapping wireless communication signals.

In one aspect, the collision avoidance device may be positioned adjacent to the interference region. The collision avoidance device analyzes the timing statistics of the first and second frequency-overlapping wireless communication signals to identify the type of frequency-overlapping protocol used and determines a quality of service parameter for the type of frequency-overlapping protocol used. Additionally, the first access area may comprise a first reception radius that encloses the first plurality of wireless communication devices, and the second access area may comprise a second reception radius that encloses the second plurality of wireless communication devices.

In still another embodiment, a communications system in a wireless network having at least two access areas and a backbone network is disclosed. The system may comprise a plurality of wireless communication devices positioned throughout the at least two access areas, wherein the plurality of wireless communication devices operate using a plurality of frequency-overlapping wireless communication protocols. The system may further comprise an interference region in the wireless network, wherein the at least two access areas overlap, and wherein the plurality of wireless communication devices coexist and exchange wireless communication signals using the plurality of frequency-overlapping wireless communication protocols. The system may still further comprise an interference moderation device positioned adjacent to the at least two access areas, wherein the interference moderation device monitors and coordinates the exchange of communication signals between the plurality of wireless communication devices to reduce collisions between the plurality of frequency-overlapping wireless communication protocols, and wherein the interference moderation device monitors and coordinates the exchange of communication signals between the plurality of wireless communication devices and the backbone network.

In one aspect, the interference moderation device comprises an access control point that is connected to the backbone network, wherein the access control point permits the interference moderation device to manage the exchange of communication signals between the plurality of wireless communication devices and the backbone network. The backbone network may comprise various land-based networks including Ethernet, Internet, digital subscriber line, dial-up, or plane telephone networks. The system may comprise an interface, wherein the plurality of wireless communication devices interacts with the interface to exchange communication signals with the backbone network. The interface may be connected to the interference moderation device and exchanges communication signals with the backbone network via the interference moderation device, wherein the plurality of wireless communication devices interact with the interface to exchange communication signals with the backbone network via the interference moderation device.

Furthermore, a method of managing a wireless communications system in an existing network having a plurality of access areas is disclosed. The method may comprise monitoring a plurality of wireless communication devices that operate using a plurality of frequency-overlapping wireless communication protocols in the plurality of access areas. The method may further comprise incorporating an interference control device into at least one of the plurality of access areas to moderate collisions in an interference region indicative of at least two overlapping access areas, wherein the interference control device monitors and coordinates the exchange of communication signals between the plurality of wireless communication devices to reduce collisions between the plurality of frequency-overlapping wireless communication protocols.

Additionally, another method of coordinating communication signals in a wireless network having a first access area with a first plurality of wireless communication devices and a second access area with a second plurality of wireless communication devices is disclosed. The method may comprise identifying an interference region comprising impending interference signals, which are indicative of the simultaneous transmission of communication signals that are derived from the first plurality of wireless communication devices using a first frequency-overlapping protocol and derived from the second plurality of wireless communication devices using a second frequency-overlapping protocol. The method may further comprise positioning an add-in control point device adjacent to the interference region, wherein the add-in control point device monitors and coordinates the exchange of communication signals in the wireless network such that a reduction in the occurrence of collisions between the communication signals derived from the first and second plurality of wireless communication devices using the first and second frequency-overlapping protocols is achieved. These and other objects and advantages of the present invention will become more fully apparent from the following description taken in conjunction with the accompanying drawings.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals in which.

DETAILED DESCRIPTION OF THE PREFERRED EMBODIMENT

Although the following description exemplifies various embodiments of the present invention, it should be understood that omissions, substitutions, and changes in the form of the detail of the apparatus, system, and method as illustrated, as well as the uses thereof, may be made by those skilled in the art, without departing from the spirit of the present invention. Consequently, the scope of the present invention should not be limited to the disclosed embodiments, but should be defined by the appended claims.

Figure 1A:
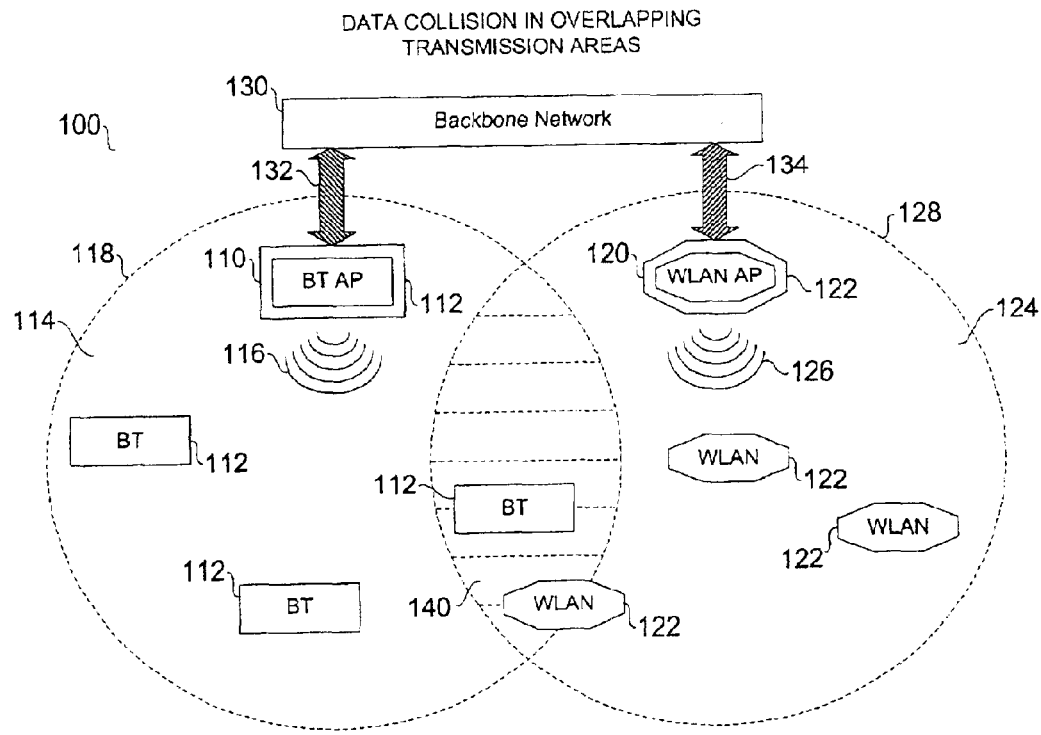
FIG. 1A illustrates one embodiment of a wireless network where wireless communication devices operate in a plurality of overlapping transmission areas and communicate with a backbone network.

FIG. 1A illustrates a wireless network 100 having wireless communication signals 116, 126 which conflict in an overlapping transmission region 140. Within the wireless network 100, a plurality of wireless communication devices or data transfer terminals 110, 112, 120, 122 operate within one or more access areas 114, 124. Each access area 114, 124 is further characterized by a wireless communication signal reception radius 118, 128, respectively. The wireless transmission signals 116, 126 produced by the wireless communication devices 110, 112, 120, 122 may be received by other wireless communication devices 110, 112, 120, 122 within the same access area 114, 124, respectively, including the overlapping transmission region 140.

As illustrated in FIG. 1A, a first access area 114 comprises a first subset of wireless communication devices 112, including a first access point 110, that utilize a first wireless communication protocol to exchange information and communicate with each other in a manner such that the first subset of wireless communication devices 110, 112 share the first access area 114. Similarly, a second access area 124 comprises a second subset of wireless communication devices 122, including a second access point 120, that utilize a second wireless communication protocol to exchange information and communicate with each other in a manner such that the second subset of wireless communication devices 120, 122 share the second access area 124. In one aspect, the wireless communication devices 110, 112, 120, 122 may be configured to utilize at least one of a Bluetooth (BT) communication protocol and a Wireless Local Area Network (WLAN) communication protocol in the wireless network 100.

For illustrative purposes, the first subset of wireless communication devices 110, 112 operate using the first wireless protocol, such as the BT protocol, and the second subset of wireless communication devices 120, 122 operate using the second wireless protocol, such as the WLAN protocol. The nature of the wireless communication protocols is such that the wireless communication protocols operate in the wireless network 100 using at least a portion of the electromagnetic spectrum. It should be appreciated that the first and second subset of wireless communication devices 110, 112, 120, 122 may use either the BT wireless communication protocol or the WLAN wireless communication protocol without departing from the scope of the present invention. In one embodiment, the wireless communication devices 110, 112, 120, 122 may comprise electronic devices, such as servers, personal computers, laptop computers, personal digital assistants (PDAs), peripheral devices, printers, storage devices, scanners, compact disc devices, cell phones, stereos, digital video disc devices, security systems, etc, wherein each device may be configured to function as a wireless communication device 110, 112, 120, 122 in the wireless network 100.

In one embodiment, the first access area 114 represents a BT piconet, wherein the first subsets of wireless communication devices 110, 112 comprise BT wireless communication devices. Therefore, the first access point 110 may serve as a BT master device and an access point or gateway for the first subset of communication devices 112 to communicate with a backbone network 130 via a first communication link 132. In one aspect, the backbone network 130 may include various information exchange networks, such as an Ethernet, an Intranet, and/or the Internet. Typically, the backbone network comprises devices interconnected via wired connections to which the wireless network 100 is desirably interconnected. In one aspect, interconnection between the wireless network 130 is desirable to permit the wireless devices 112, 122 to communicate with other devices located outside of the wireless network. The communication links 132, 134, therefore, provide connectivity between the wireless network 100 and the devices associated with the backbone network to enhance connectivity and communications flexibility when using wireless devices.

In addition, the BT access point 110 manages the wireless transmissions 116 of the first subset of wireless communication devices 112 within the first access area 114, and the first subset of communication devices 112 may interact with the backbone network 130 via the communications link 132 provided by the BT access point 110. It should be appreciated that one or more of the wireless communication devices 110, 112 in the first access area 114 may be configured to function as a BT master and/or BT access point, and the one or more wireless communication devices 110, 112 in the first access area 114 may be connected to the backbone network 130 in a manner such that the devices 110, 112 communicate directly with the backbone network 130 without departing from the scope of the present invention.

Moreover, the second access area 124 represents a WLAN access area, wherein the second subset of wireless communication devices 112, 122 comprise WLAN wireless communication devices. Therefore, the second access point 120 may serve as a WLAN access point and a gateway for the second subset of communication devices 122 to communicate with the backbone network 130 via a second communication link 134. In one aspect, the WLAN access point 120 does not necessarily manage the wireless transmissions 126 of the second subset of wireless communication devices 122 within the second access area 124. In some embodiments, each station may have some distributed medium access control functions.

In addition, the second subset of communication devices 120, 122 may interact with the backbone network 130 via the communications link 134 of the WLAN access point 120. It should be appreciated that the communication links 132, 134 may comprise wireless communication links, hard-wired communication links, or some combination thereof to facilitate the exchange of information between the wireless devices 112, 122, the AP devices 110, 120, and the backbone network 130. It should be appreciated that one or more of the wireless communication devices 120, 122 in the second access area 124 may be configured to function as a WLAN access point, and the one or more wireless communication devices 120, 122 in the second access area 124 may be connected to the backbone network 130 in a manner such that the devices 120, 122 communicate directly with the backbone network 130 without departing from the scope of the present invention.

It should be appreciated that one embodiment of the ACP device 200 may be configured to comprise functionality of the first and second access point, wherein, for example, the ACP device 200 comprises the capability to function as a BT master, a BT access point, and a WLAN access point. In this particular embodiment, the ACP device 200 controls and/or supervises transmission activity and traffic in the wireless network 100, including the exchange of information between the wireless communication devices. 112, 122 using the communication signals 116, 126, in a manner that reduces interference and/or the occurrence of collision signals. In addition, the ACP device 200 may also communicate directly with the backbone network 130, such that the exchange of information between the wireless communication devices 112, 122 is moderated, monitored, and regulated via the ACP device 200.

The IEEE 802.11 medium access control (MAC) provides functionality for a reliable mechanism capable of transmitting information and data over a wireless communication medium. Finally, Bluetooth protocols provide mechanisms for transmitting information and data over the wireless communications medium. In one aspect, information and data transmitted by these protocols are integrated into a data packet, and the data packet may include a header file or description. A typical header file comprises information that may include various packet transmission characteristics, such as packet data rates, packet lengths, packet timing characteristics, and packet transmission frequencies.

FIG. 1A also illustrates an interference region 140 that may occur in the wireless network 100, where wireless signal transmissions originating from the first frequency-overlapping protocol coexist with wireless signal transmissions originating from the second frequency-overlapping protocol. In other words, the interference region 140 includes transmission regions where a first wireless signal reception radius 118 of the first access area 114 overlaps a second wireless signal reception radius 128 of the second access area 124. As previously discussed, the use of one or more frequency-overlapping protocols may result in transmission collisions or interference when the protocols operate within the same vicinity of one another. Transmission collisions between the frequency overlapping protocols are undesirable as they may result in data drop-offs, transmission errors, or slow downs in network traffic. In one aspect, frequency-overlapping wireless communication signals 116, 126 transmitted in this manner may produce one or more collision signals within the interference region 140.

In one embodiment, the collision signal is an interference signal in which a plurality of communication signals overlap in time and/or frequency, and the collision signal may appear as a transmission signal with modulated noise, a distortion signal, or an error laden signal to the receiving communication devices 110, 112, 120, 122.

It should be appreciated that collisions may also occur when a plurality of BT piconets coexists in an overlapping access area. In one aspect, the discussion described herein may also be applied to wireless networks comprising a plurality of overlapping BT piconets as well as a plurality of overlapping WLAN-BT access areas without departing from the scope of the present invention. It should also be appreciated that, although the access areas 114, 124 illustrated in FIG. 1A are shown to partially overlap, the access areas 114, 124 may wholly overlap. Moreover, the communication devices 110, 112, 120, 122, that may use one or more frequency-overlapping protocols may be positioned in proximity to one another such that the access area for the frequency-overlapping protocols exists in the same spatial locality (i.e. access areas defined by identical or concentric spatial regions).

Furthermore, it should also be appreciated that the communication devices 110, 112, 120, 122 may be positioned and/or re-positioned within the access areas 114, 124 such that only a portion of the devices 110, 112, 120, 122 reside in the interference area 140 where the communication protocols partially or wholly overlap. However, the presence of any communication device 110, 112, 120, 122 within the region of overlap may be sufficient for creating interference and collision signals between the frequency-overlapping protocols in a manner as previously described.

Figure 1B:
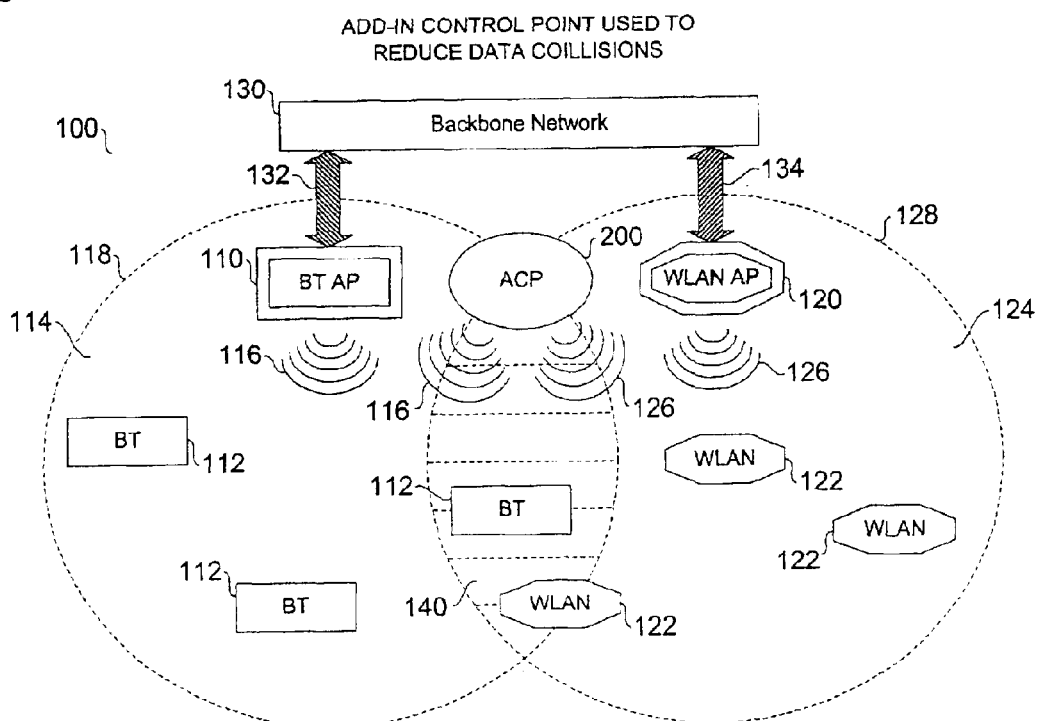
FIG. 1B illustrates one embodiment of the wireless network in FIG. 1A with the insertion of an add-in control point device for moderating wireless frequency overlapping traffic between the wireless communication devices.

FIG. 1B illustrates one embodiment of the wireless network 100 in FIG. 1A with the insertion of a data collision rectification device or add-in control point (ACP) device 200. The ACP device 200 is positioned within the wireless network 100 and permits the coexistence of the above mentioned frequency-overlapping protocols in the wireless network 100. The ACP device 200 functions as a wireless signal transmission supervisor or controller for at least one of the frequency-overlapping protocols to permit uncorrupted data transmissions in the overlying access areas 114, 124. In one aspect, the ACP device 117 is implemented to reduce packet collisions and moderate signal interference between the first and the second frequency-overlapping protocols. Furthermore, the ACP device 200 may be configured with the capability of monitoring, moderating, and/or coordinating the transmission characteristics of at least one of the wireless communication signals 116, 126 for the purpose of maintaining the quality of service parameters for at least one of the protocols in a manner that will be discussed in greater detail herein below.

In one aspect, the ACP device 200 may be implemented as an independent or stand-alone device. One desirable feature of the independent ACP device 200 is that it may be conveniently positioned within an existing wireless communications network 100 to improve data exchange and throughput in the wireless network 100 without substantial or significant modification of the existing network. For example, the independent ACP device 200 can be configured to moderate wireless communication signals 116, 126 between the frequency-overlapping wireless protocols in a manner which does not require other communication devices 110, 112, 120, 122 within the network 100 to be modified, repositioned, or replaced.

As a result, the independent ACP device 200 may substantially reduce the potential costs associated with modifying, repositioning, and/or replacing existing wireless communication devices 110, 112, 120, 122 with dual functionality wireless devices. Advantageously, this feature of the independent ACP device 200 increases the flexibility, functionality, and/or stability of the wireless network 100 and the associated wireless communication devices 110, 112, 120, 122.

Moreover, it will further be appreciated that, although the ACP device 200 is shown positioned in the interference region 140 of the access areas 114, 124, the ACP device 200 may also be positioned elsewhere within the access areas 114, 124. For example, the ACP device 200 may be positioned within the first access area 114 to moderate the first subset of wireless communication devices 110, 112, which are associated with the first frequency-overlapping protocol. In this configuration, network traffic flow may be improved by moderating the wireless communication signals of the first subset of wireless communication devices 110, 112 whose data transfer activities are managed by the ACP device 200 to reduce signal transmission interference with the second subset 112, 122 of wireless communication devices, whose data transfer activities are not managed by the ACP device 200. This embodiment and other various embodiments of the present invention will be described in greater detail herein below.

In one aspect, the moderation of data exchange by the ACP device 200 may be accomplished by integration of a monitoring functionality to identify impending data collisions between the frequency-overlapping protocols. The ACP device 200 may further identify quality of service parameters to determine if the protocols are operating within desirable ranges. Moderation one or more of the protocols is then performed to avoid data collisions arising from overlapping transmissions between the protocols while maintaining data throughput within acceptable ranges in a manner as described in the Applicant's co-pending U.S. application Ser. No. 10/003,703 entitled "COORDINATION ARCHITECTURE FOR WIRELESS COMMUNICATION DEVICES USING MULTIPLE PROTOCOLS", which is hereby incorporated by reference in its entirety.

In another aspect, the moderation of data exchange by the ACP device 200 may be accomplished by the ordering or sequencing of data packets to be transmitted using the frequency overlapping protocols such that the data transmissions of the two protocols does not occur at the same time so as to prevent or avoid data transmission or protocol overlap. The ACP device 200 may further determine a desirable ordering of the packets to be transmitted across the wireless network and influence the transmission of the data packets in either frequency overlapping protocol or a combination thereof so as to achieve a reduced number of data collisions. In one embodiment, the ordering or sequencing of data packets may be accomplished by a method of generating a local and global timing map that identifies the timing of current and future packets to be transmitted in a manner as described in the Applicant's U.S. Provisional Applications entitled "REMOTELY-COOPERATIVE SCHEDULING SOLUTION FOR MODERATING WIRELESS PROTOCOLS" Ser. No. 60/336,339 and Ser. No. 60/367,683, which are hereby incorporated by reference in their entirety.

Advantageously, a local packet timing map and a global packet timing map may be used to identify imminent or likely collisions between the locally and globally transmitted information packets. When a possible collision is determined, collision avoidance procedures may be administered by a remotely-cooperative scheduling device, such as the ACP device 200 and other various ACP device embodiments as described herein to reduce the occurrence of collisions in the wireless network 100. Local and global timing maps may be implemented as a mechanism to define and summarize the scheduled positions, with respect to time and frequency, of the locally and globally transmitted information packets. In addition, overlapping local and global information packets are likely to be identified and collisions are likely to be avoided so as to increase the reliability and throughput of the wireless network 100 in a substantially efficient and effective manner.

In addition, the ACP device 200 determines the ordering of the data packets by acquiring timing information from previously transmitted data packets as well as, timing information from data packets that are currently being transmitted. The ACP device 200 may further receive transmission characteristics, including timing information, in a collision monitoring process to reduce interference and data corruption resulting from simultaneous transmission of data packets using either of the frequency overlapping protocols. The collision monitoring process will be described in greater detail herein below with reference to FIG. 5.

Moreover, the ACP device 200 may update timing information, as needed, to reschedule data packets. In updating the timing information for the data packets, the ACP device 200 may also update or modify the information contained in the data packet to reflect the new timing information. For example, the ACP device 200 may modify the header information contained in the buffered or queued packets such that upon transmitting the data packets, other devices within the network which receive the data packets may interpret the header information to subsequently influence the data transmission characteristics of these other devices.

In another aspect with reference to FIG. 1B, the ACP device 200 may be configured to avoid collisions in the wireless network 100 through the use of a jamming signal to defer wireless signal transmissions using at least one of the frequency-overlapping protocols. Embodiments of the jamming signal that may be used by the ACP device 200 are described in Applicant's co-pending U.S. patent application Ser. No. 10/053,860 entitled "COLLISION RECTIFICATION IN WIRELESS COMMUNICATION DEVICES", which is hereby incorporated by reference in its entirety. The jamming signal may be used to reduce interference and data corruption resulting from the simultaneous transmission of frequency-overlapping data packets and transmission signals that utilize the frequency-overlapping protocols in the wireless network 100. In one aspect, the ACP device 200 avoids collisions based on acquired timing information and statistics of the wireless network traffic. The timing information and statistics includes header information, which is indicative of previously and currently transmitted characteristics of the data packets.

Additionally, the ACP device 200 monitors the wireless network 100 so as to coordinate the transmission traffic of frequency-overlapping protocols by prioritizing data packets. One desirable feature observed when using this method is that by acquiring timing information, packet length information, and transmitting channel frequency information from the header characteristics of previously and currently transmitted data packets, the ACP device 200 may reduce the signal interference and corruption caused by collisions between the frequency-overlapping protocols. In one aspect, the ACP device 200 may accomplish this task by utilizing the jamming signal to defer the data packets of one protocol and create an open channel for the data packets of the other protocol when a collision is imminent or likely to occur.

Furthermore, the wireless communication devices 110, 112, 120, 122 may be configured to monitor the wireless network 100 so as to determine when to transmit data packets on an open channel. If a busy signal is asserted on the wireless network 100 or a channel is unavailable, the wireless communication devices 110, 112, 120, 122 may wait for an available channel. Otherwise, the wireless communication devices 110, 112, 120, 122 may transmit data packets without moderation from the ACP device 200.

In still another aspect with reference to FIG. 1B, the ACP device 200 acts as a BT master device, which is configured to monitor, manage, and/or coordinate the BT transmission traffic in the wireless network 100 in a manner as described in the Applicant's co-pending U.S. patent application Ser. No. 10/066,284 entitled "CENTRALIZED COORDINATION POINT FOR WIRELESS COMMUNICATION DEVICES USING MULTIPLE PROTOCOLS"which is hereby incorporated by reference in its entirety. Advantageously, the ACP device 200 may comprise a centralized control point and be integrated into an existing wireless network with mixed protocols and topologies to increase data throughput by reducing conflicting data transmissions using frequency-overlapping protocols. In addition, modifications to existing access or control points may be performed and the traffic evaluation and coordination functions utilized to improve load balancing and frequency sharing functionality across multiple frequency-overlapping protocols without the need for an independent centralized control point device or system. This particular embodiment will be described in greater detail herein below.

Figure 1C:
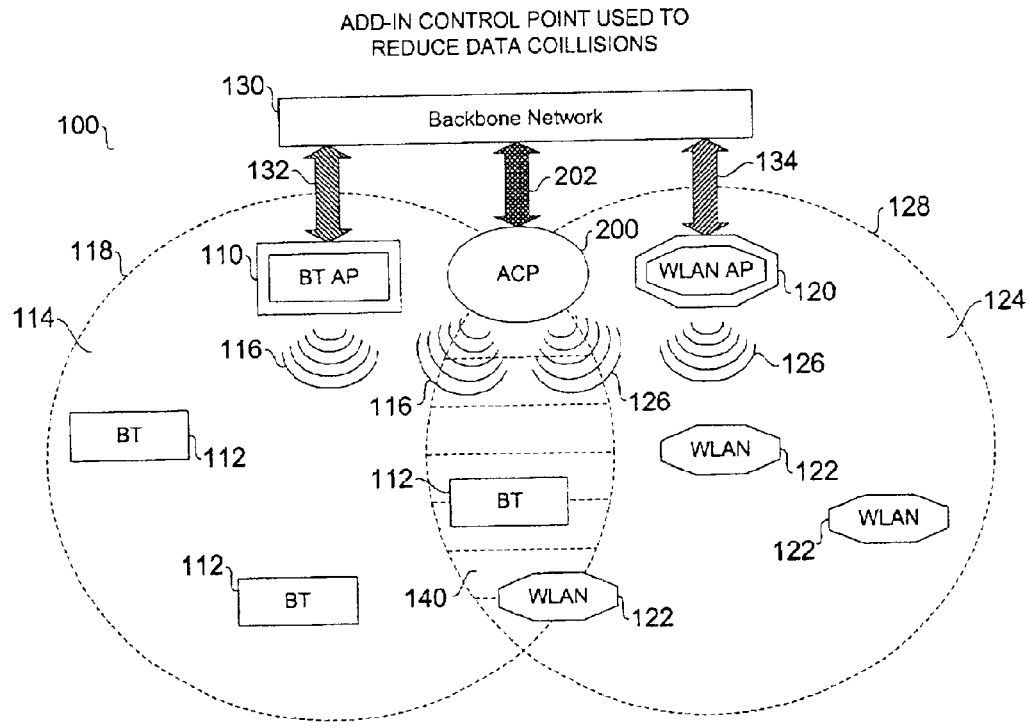
FIG. 1C illustrates one embodiment of the wireless network in FIGS. 1A, 1B with the insertion of the add-in control point device for moderating wireless frequency overlapping traffic between the wireless communication devices, wherein the add-in control point device communicates directly with the backbone network.

FIG. 1C illustrates another embodiment of the wireless network 100 in FIG. 1 with the insertion of the add-in control point device 200. This particular embodiment of the ACP device 200 comprises the scope and functionality of the previous embodiment in FIG. 1B with the addition of a third communication link 202, such as a wireless communication link, hardwired communication link, and/or some combination thereof to facilitate the exchange of information between the ACP device 200 and the backbone network 130. In one aspect, the third communication link 202 may be used to transfer software updates to the ACP device 200 from a remote location via the backbone network 130. The third communication link 202 may also be used by a remote user to monitor the activities of the ACP device 200 in its particular location.

Furthermore, each communication link 132, 134, and 202.may provide access to the backbone network by the devices of the wireless network to thereby improve connectivity and functionality of the wireless network. In one aspect, the communications links 132, 134, and 202 provide redundant accessibility to the backbone network 130 and may be utilized simultaneously to distribute data transmissions to the backbone network 130. This feature is useful for load balancing and improving bandwidth limitations and bottlenecks. In addition, the communication link 202 may be used by the ACP device 200 to acquire the traffic information, which is acquired through the air channel in the network configuration of FIG. 1B. In this particular case, the acquired information may then be used by the ACP device 200 to perform the traffic coordination and moderation tasks as previously described in the network configuration of FIG. 1B.

Figure 1D:
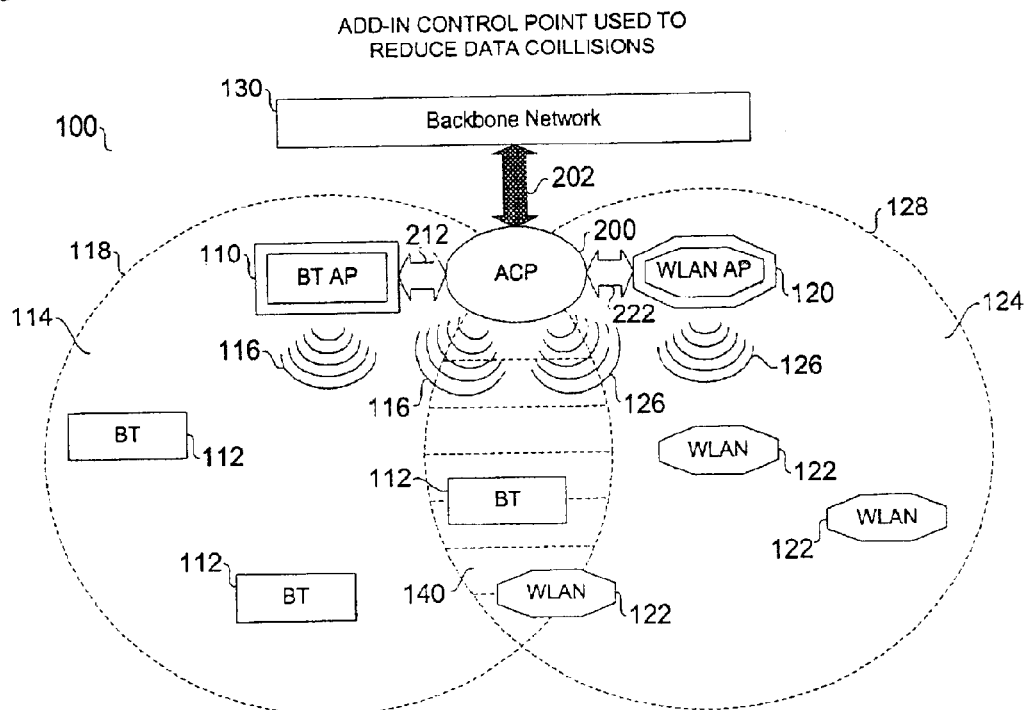
FIG. 1D illustrates one embodiment of the wireless network in FIGS. 1A–1C with the insertion of the add-in control point device for moderating wireless frequency overlapping traffic between the wireless communication devices and the backbone network.

FIG. 1D illustrates still another embodiment of the wireless network 100 in FIG. 1 with the insertion of the add-in control point device 200. This embodiment of the ACP device 200 may comprise the scope and functionality of the previous embodiments in FIGS. 2A, 2B with the addition of a fourth and/or a fifth communication link 212, 222, respectively. In one aspect, the communication links 212, 222 may comprise a wireless communication link, a hardwired communication link, and/or some combination thereof to facilitate the exchange of information between the ACP device 200 and the first and second AP devices 110, 120. In addition, the first and second communication links 132, 134 may be absent from the wireless network 100 and replaced by the third communication link 202, wherein the BT and WLAN AP devices 110, 120 communicate with the backbone network via the ACP device 200 and the fourth and fifth communication links 212, 222, respectively.

Advantageously, the ACP device 200, in one embodiment, may be placed into a wireless network or access area where the wireless communication devices 110, 112, 120, 122 operate and have been connected to the backbone network 130 in a manner such that the existing BT AP device 110 and the WLAN AP device 120 need not to be replaced. In another embodiment, the ACP device 200 may comprise the functionality of the BT and WLAN AP devices 100, 120 and be placed into a wireless network that may not have pre-existing BT and WLAN AP devices 110, 120 in the wireless network. In these situations, the ACP device 200 may act as a gateway for the first and second communication devices 112, 122 to communicate with the backbone network 130. In this particular embodiment, the ACP device 200 functions as a co-existive solution for improving communication between frequency-overlapping protocols in the wireless network 100 and also as a gateway to the backbone network 130. As is illustrated in the FIG. 1D, the first AP device 110 may be connected to the ACP device 200 via the fourth communication link 212, and the second AP device 120 may be connected to the ACP device 200 via the fifth communication link 222 with the ACP device 200 connected to the backbone network via the third communication link 202. It should be appreciated that the various arrangements and linkages between the ACP device 200 and the devices of the wireless network provide improved accessibility to the resources of the backbone network 130.

Figure 1E:
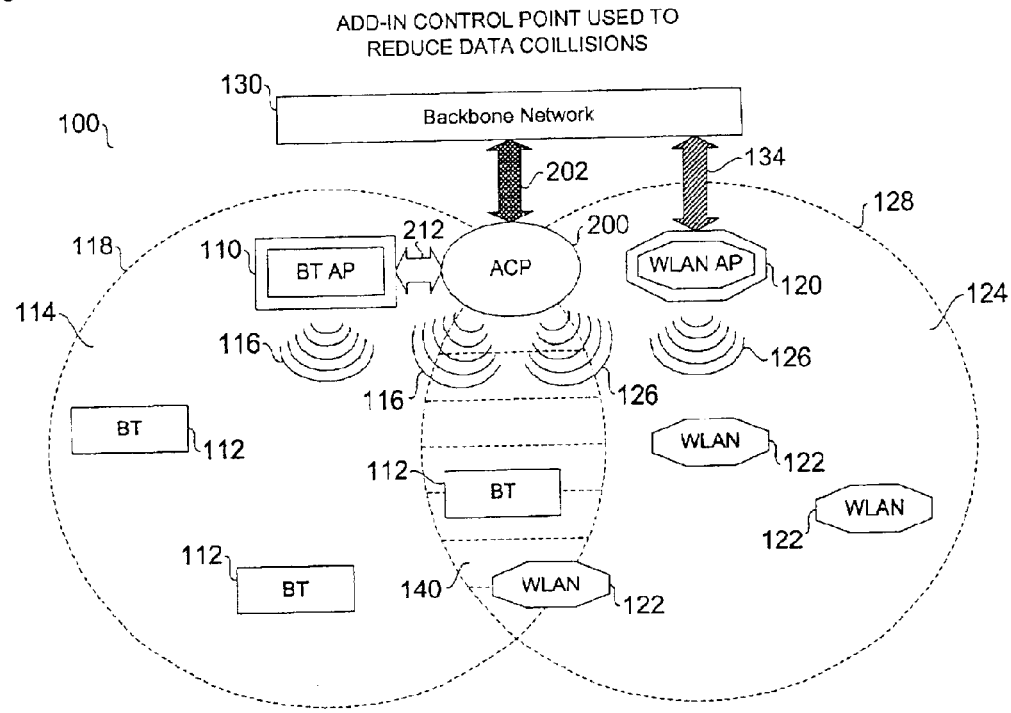
FIGS. 1E–1F illustrates one embodiment of the wireless network in FIGS. 1A–1D with the insertion of the add-in control point device for moderating wireless frequency overlapping traffic between the wireless communication devices and the backbone network for at least one of the access areas.

FIG. 1E illustrates yet another embodiment of a wireless network with the insertion of the add-in control point (ACP) device 200. This particular embodiment of the ACP device 200 may comprise the scope and functionality of the previous embodiments in FIGS. 2A–2C with the utilization of the second, third, and fourth communication links 134, 202, 212, respectively. As previously described, the second communication link 134 facilitates the exchange of information between the second AP device 120 and the backbone network 130. The third communication link 202 facilitates the exchange of information between the ACP device 200 and the backbone network 130. And, the fourth communication link 212 facilitates the exchange of information between the ACP device 200 and the first AP device 110.

Advantageously, this particular embodiment in FIG. 1E illustrates a wireless network configuration whereby the first subset of wireless communication devices 112 and the ACP device 200 may be added to an existing wireless network originally comprising the second AP device 120 and the second subset of wireless communication devices 122. As a result, the first AP device 110 and the first subset of wireless communication devices 112 may interact with the backbone network 130 and the second subset of wireless communication devices 122 via the ACP device 200.

Figure 1F:
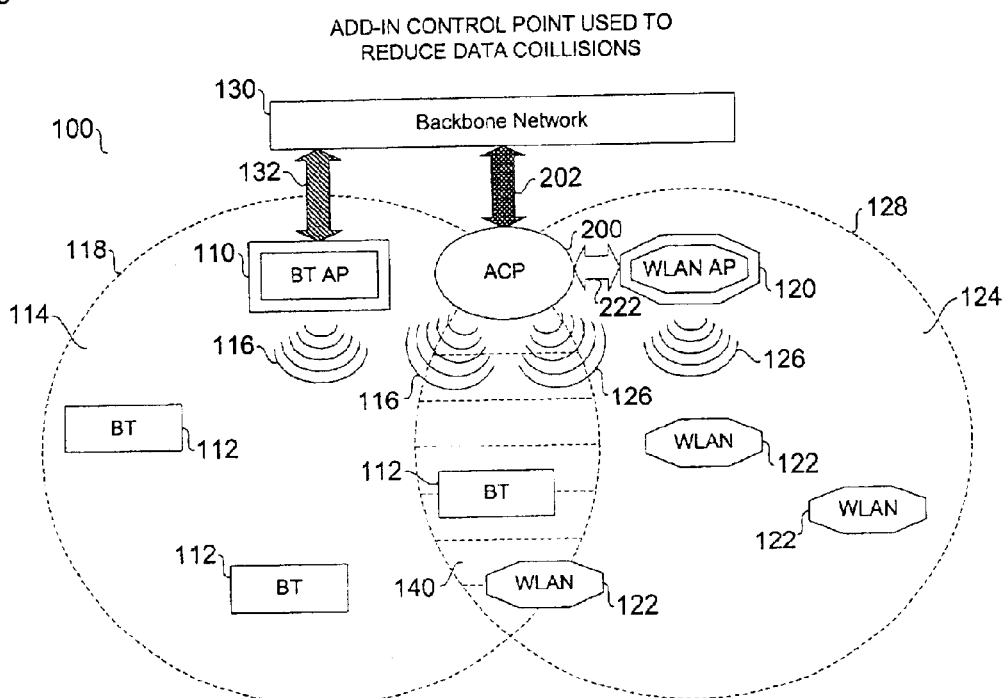

FIG. 1F illustrates an alternative embodiment of the wireless network, whereby the second AP device 120 is connected to the ACP device 200 via the fifth communication link 222; the ACP device is connected to the backbone network 130 via the third communication link 202; the first AP device 110 is connected to the backbone network 130 via the first communication link 132. In this particular embodiment, the second subset of wireless communication devices 122 and the ACP device 200 may be added to an existing wireless network originally comprising the first AP device 110 and the first subset of wireless communication devices 112. In addition, the second AP device 120 and the second subset of wireless communication devices 122 may interact with the backbone network 130 and the first subset of wireless communication devices 112 via the ACP device 200.

It will be appreciated that the various embodiments of ACP device 200 integration into the wireless network represent some of the possible combinations of ACP device functionality. These and other configurations can be desirably implemented to provide improved network connectivity while at the same time reducing problems associated with frequency-overlapping transmissions for wireless devices.

Figure 2A:
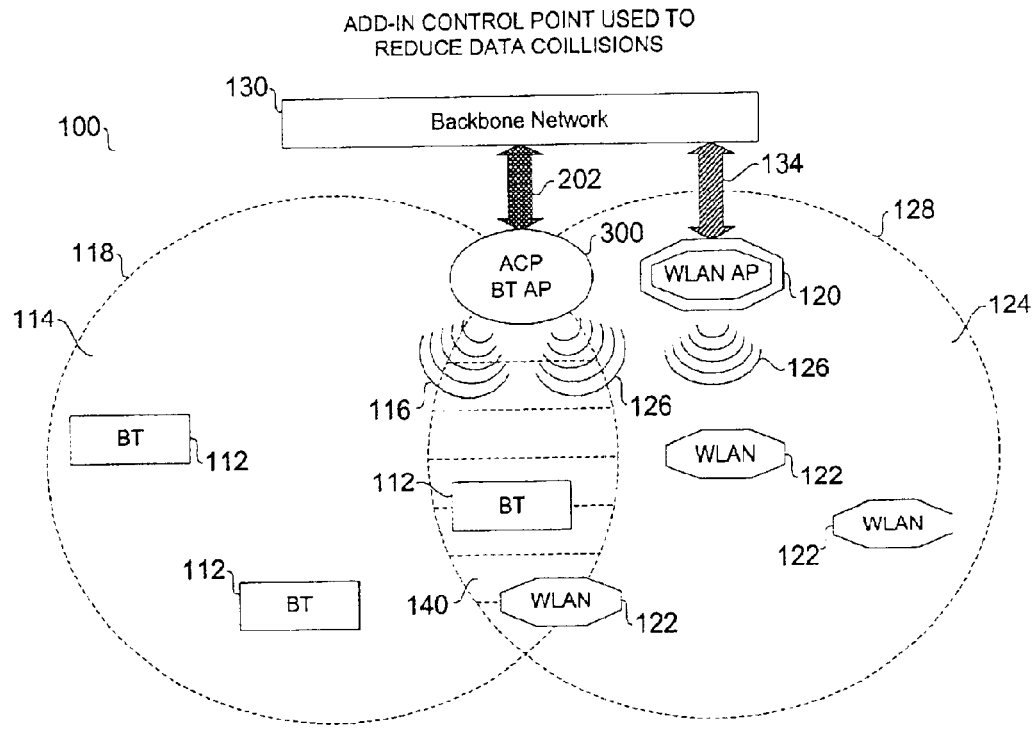
FIGS. 2A–2E illustrate various embodiments of the wireless network in FIG. 1A with the insertion of the add-in control point device for moderating frequency overlapping data transmissions, wherein the add-in control point comprises supervisory functionality for at least one of the access areas.

FIG. 2A further illustrates another embodiment of an ACP device 200, wherein the first AP device 110 and the ACP device 200 are combined to form a first integrated ACP device 300. In one aspect, the first AP device 110 may be modified to include the scope and functionality of the ACP device 200 in a manner as described in the Applicant's co-pending U.S. patent application Ser. No. 10/066,284 entitled "CENTRALIZED COORDINATION POINT FOR WIRELESS COMMUNICATION DEVICES USING MULTIPLE PROTOCOLS". Advantageously, the first integrated ACP device 300 improves the flexibility of wireless network design by reducing limitations imposed by existing wireless devices.

For example, a wireless network area may have originally been configured to comprise the second access area 128 with the second communication link 134 to the backbone network 130. Over time, a need may emerge to expand the second access area 128 to include the first access area 118. By incorporating the first integrated ACP device 300 within the wireless network the transmission area may be expanded and include other wireless devices which operate using a frequency-overlapping protocol. In one aspect, the second access area comprises a WLAN access point 120 and WLAN devices 122, and the first integrated ACP device 300 functions as a BT master to supervise the BT devices 112 and coordinate the frequency-overlapping wireless transmissions in the first and second access areas 118, 128 in a manner as previously described. In another aspect, the second access area 128 may comprise a second BT piconet comprising a BT access point 120 and BT devices 122, and the first integrated ACP device 300 functions as a BT master to supervise the BT devices 112 in a first BT piconet 118 and coordinate the frequency-overlapping wireless transmissions in the first and second piconets 118, 128 in a manner as previously described.

Figure 2B:
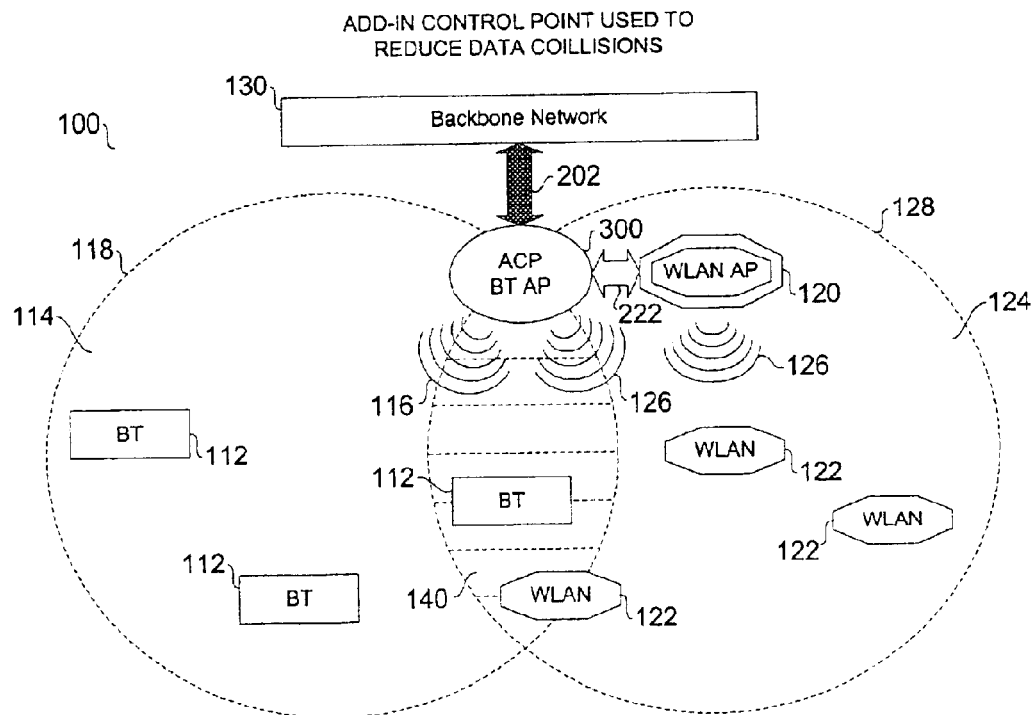

FIG. 2B illustrates another embodiment of the network configuration described in FIG. 2A, wherein the second AP device 120 is connected to the first integrated ACP device 300 via the fifth communication link 222. As a result, the second communication link 134 may be removed, and the fifth communication link 222 used instead. Advantageously, this particular embodiment utilizes a single connection, such as the third communication link 202, to the backbone network 130 to monitor, manage, and coordinate the exchange of information between the wireless devices 112, 122 and the backbone network 130. Additionally, the first integrated ACP device 300 may monitor, manage, and coordinate the wireless signal transmissions of the wireless devices 112, 122 in both the first and second access areas 118, 128. It should be appreciated that similar implementation examples, as previously described in reference to FIG. 2A, apply to the implementation of this particular embodiment.

FIGS. 3C, 3D illustrate alternative embodiments to FIGS. 3A, 3B, wherein the second AP device 120 and the ACP device 200 are combined to form a second integrated ACP device 320. In one aspect, the second ACP device 110 may be modified to include the scope and functionality of the ACP device 200 in a manner as described in the Applicant's co-pending U.S. patent application Ser. No. 10/053,860 entitled "COLLISION RECTIFICATION IN WIRELESS COMMUNICATION DEVICES". Advantageously, as with the embodiment of the first integrated ACP device 300 in FIGS. 3A, 3B, the second integrated ACP device 300, demonstrates the flexibility and efficiency of one aspect of the present invention to broaden the scope of the wireless network 100 to include the plurality of access areas 118, 128.

For example, the first access area 118 may comprise a BT piconet including a BT Access point 110 and BT wireless communication devices 112. In addition, the second access area 128 may comprise WLAN wireless communication devices 122. If the second integrated ACP device includes WLAN functionality, one embodiment of the second ACP device 320 may include the ability of the device 320 to defer the transmission of WLAN data packets in the interference region 140 in favor of allowing BT data packets to be transmitted. As a result, the second ACP device 320 may be equipped to monitor, manage, and coordinate the wireless signal transmissions of the wireless devices 112, 122 in both the first and second access areas 118, 128.

Figure 2C:
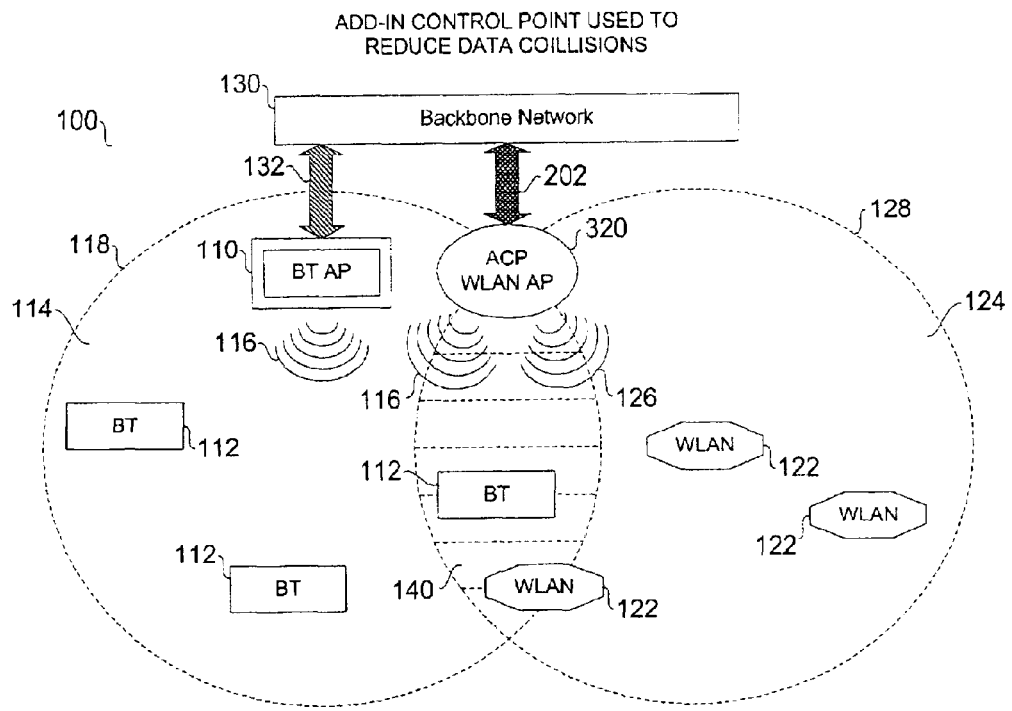
Figure 2D:
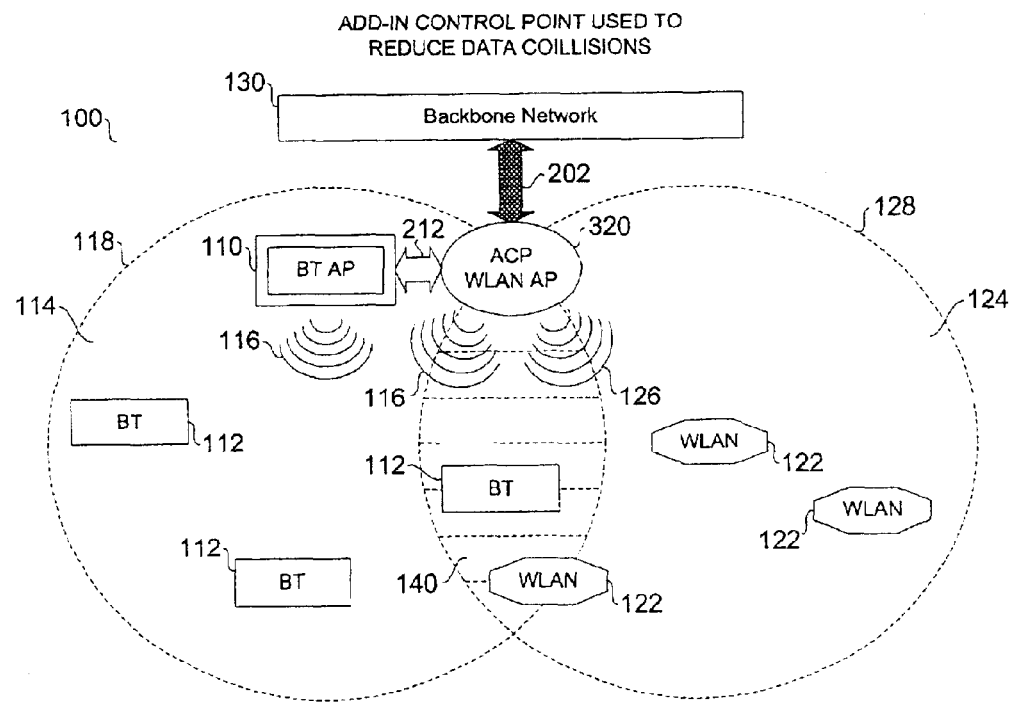

FIG. 2C further illustrates that the first AP device 110 and the first subset of wireless communication devices 112 interact with the backbone network 130 via the first communication link 132. In addition, the second integrated ACP device 320 and the second subset of wireless communication devices 122 interact with the backbone network 130 via the third communication link 202. Alternatively, FIG. 2D further illustrates that the first AP device 110 and the first subset of wireless communication devices 112 communicate with the backbone network 130 through the second integrated ACP device 320 such that interaction with the backbone network 130 is transferred via the third and fourth communication link 202, 212.

Figure 2E:
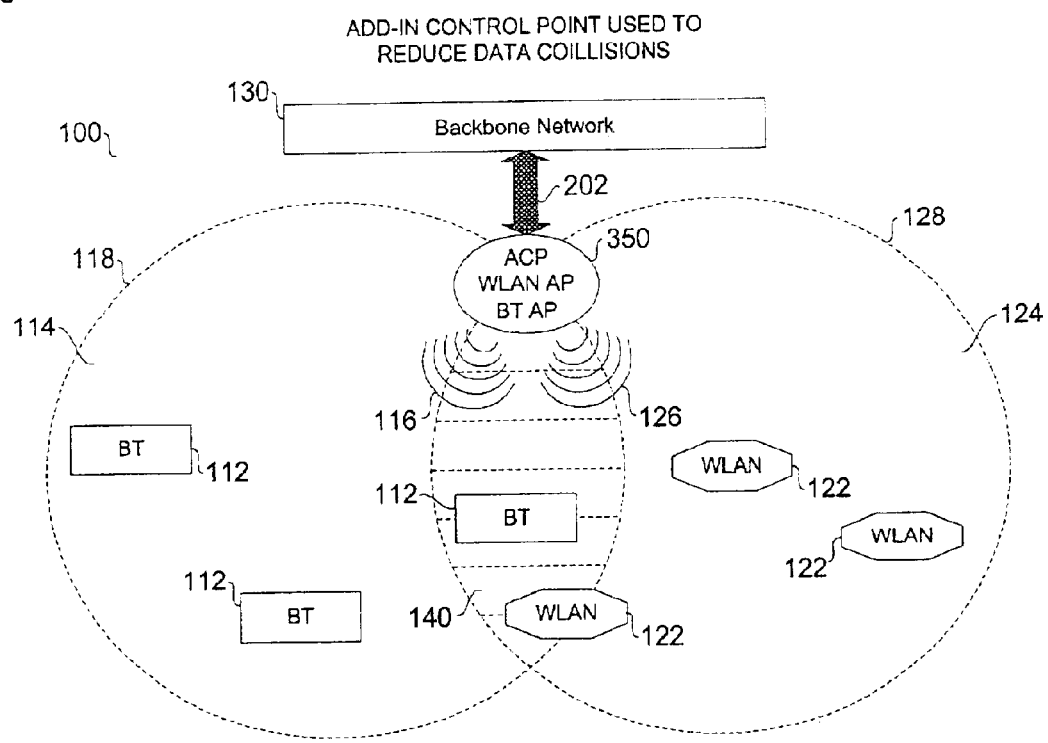

FIG. 2E illustrates one embodiment of a third integrated ACP device 350 that may be configured to comprise functionality of the first and second access point 110, 120, wherein, for example, the ACP device 350 comprises the capability to function as a BT master, a BT access point, and a WLAN access point. In one aspect, the first AP device 110, the second AP device 120, and the ACP device 200 may be combined to form the third integrated ACP device 350. In this particular embodiment, the ACP device 350 controls and/or supervises transmission activity and traffic in the wireless network 100, including the exchange of information between the wireless communication devices 112, 122 using the communication signals 116, 126, in a manner that reduces interference and/or the occurrence of collision signals.

In addition, the ACP device 350 may also exchange information and/or communicate directly with the backbone network 130 via the third communication link 202, such that the exchange of information between the wireless communication devices 112, 122 and the backbone network 130 may be moderated, monitored, and regulated via the ACP device 350. Advantageously, this embodiment of the ACP device 350 may be employed in a wireless network 100 so as to replace one or more existing access points as illustrated in FIG. 1A. This embodiment of the ACP device 350 is exceptional in that it efficiently moderates the wireless communication traffic in the wireless network 100 in a manner so as to improve throughput for multiple protocols.

Figure 3:
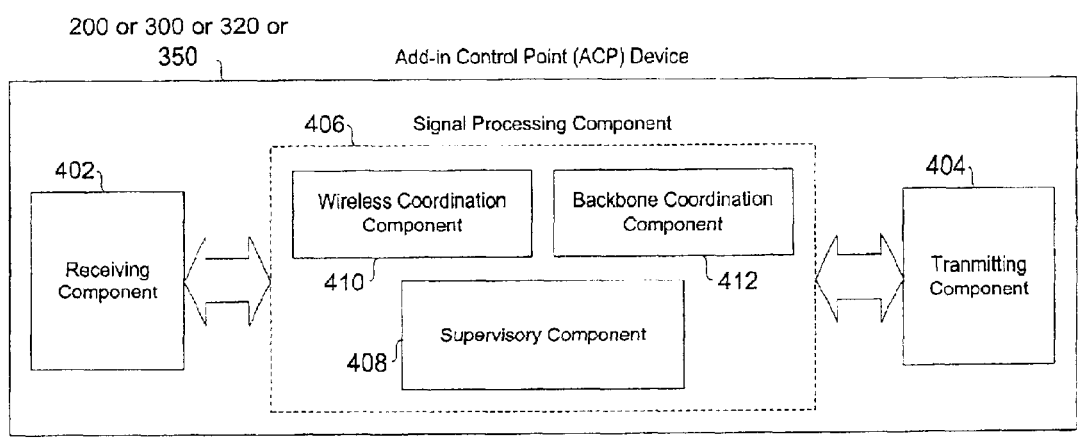
FIG. 3 illustrates a block diagram of an add-in control point device architecture used to monitor, moderate, and/or coordinate wireless communication signals in a frequency-overlapping network.

FIG. 3 illustrates a block diagram of one embodiment of the ACP device 200 architecture used to monitor, moderate, and/or coordinate wireless communication signals 116, 126 in the wireless network 100. In addition, the architecture may also be used to describe and/or embody the first, second, and third integrated ACP devices 300, 320, 350. In one aspect, the ACP device 200, 300, 320, 350 architecture may comprise a receiving component 402, a transmitting component 404, and a signal processing component 406. The components 402, 404, 406 may be configured to operate independently of the wireless network devices 110, 112, 120, 122 and to monitor, moderate, and/or coordinate the wireless frequency-overlapping communication signals 116, 126, which utilize the previously described frequency-overlapping communication protocols in the wireless network 100.

Advantageously, the component and system architecture of the ACP devices 200, 300, 320, 350 may comprise either a stand-alone device to be positioned substantially within the wireless network 100 or an integrated functionality incorporated onto at least into one of the existing network devices, such as an existing access point. In one embodiment, the stand-alone device may comprise an independent, self-contained apparatus comprising electronic components in a manner as described in greater detail herein below. In another embodiment, the integrated system architecture of the ACP devices 200, 300, 320, 350 may be implemented using a semi-conductor micro-circuit chip which may comprise an application specific integrated circuit (ASIC) or a micro-computing structure, such as a digital signal processing (ASP) chip designed for integration into electronic devices such as computers, workstations, servers, cell phones, routers, personal digital assistants (PDAs), and the like. The components of the integrated system architecture will be described in greater detail herein below.

In one embodiment, the receiving component 402 may be configured to listen to the wireless network 100 and monitor the wireless communication traffic in the wireless network 100. The receiving component 402 may be further configured to receive communication signals 116, 126 including collision signals where the frequency-overlapping protocols coexist and the wireless devices 110, 112, 120, 122 are in use. In one aspect, collision signals result from the simultaneous transmission of at least two frequency-overlapping communication signals that may share the same temporal region and/or frequency channel. Additionally, the communication signals 116, 126 may comprise previously described data packets, which provide a medium for data exchange between the wireless communication devices 110, 112, 120, 122.

In one embodiment, the receiving component 402 may be equipped with singular functionality including the capability to receive, demodulate, and decode either WLAN or BT data packets. In an alternative embodiment, the receiving component 402 may be equipped with dual functionality including the capability to receive, demodulate, and decode WLAN and BT data packets in either a simultaneous manner or separate manner. Moreover, the receiving component 402 may comprise the capability of providing the signal processing component 406 with the received, demodulated, and decoded WLAN and BT data and information. Moreover, the receiving component 402 may also comprise the capability to receive a collision signal and/or a plurality thereof.

In one embodiment, the transmitting component 404 may be configured to transmit data packets in at least one of the frequency-overlapping protocols, wherein the transmitting component 404 may comprise functionality including the capability to modulate, encode, and transmit either WLAN or BT packets within the access areas 118, 128. Alternatively, the transmitting component 404 may be equipped with functionality including the capability to modulate, encode, and transmit both WLAN and BT packets within the access areas 114, 124 including the interference region 140. Additionally, the transmitting component 404 may further comprise the capability to accept commands and transmission data from the signal processing component 406.

It should be appreciated that the receiving component 402 and the transmitting component 404 may be combined to form a transceiving component and/or replaced with a transceiving component without departing from the scope of the present invention. In one aspect, a transceiver or transceiving component comprises the capability to receive and transmit signals and/or data packets. Therefore, a transceiving component would be configured to comprise the functionality and scope of both the receiving component 402 and the transmitting component 406 as described in FIG. 3.

In one embodiment, the signal processing component 406 may comprise a supervisory component 408, a wireless coordination component 410, and a backbone coordination component 412. The supervisory component 408 may be configured to control the receiving component 402 and the transmitting component 404 via the signal processing component 406. In addition, the supervisory component 408 may be further configured to formulate transmission traffic coordination decisions based on pre-determined criteria via the supervisory component 408. Therefore, the supervisory component 408 may further comprise the capability to perform functions which may include: the ability to accept decoded data from the receiving component 402, the ability to determine the transmission protocol type, and the ability to extract header information that was present in the data transmission of the received wireless communication signal. Moreover, the supervisory component 408 may further comprise the capability to schedule the communication signals 116, 126 in the wireless network 100 for the purpose of reducing interference and collisions between the frequency-overlapping protocols. The various methods of ordering and/or scheduling as described previously may include packet jamming, packet deferral, packet dropping, and other methodologies including local and global timing map generation which are described in greater detail elsewhere in this document. It should be appreciated that the coordination of wireless data and signal transmissions in access areas, such as the access areas 114, 124, allows for the coexistence of the previously mentioned plurality of frequency-overlapping protocols, such as WLAN and BT wireless communication protocols.

In one aspect, data packet characteristics including protocol type may be used by the wireless coordination component 410 to prioritize packet transmissions of the wireless communication devices 110, 112, 120, 122 within the wireless network 100. As a result, the signal processing component 406 may utilize at least one of the wireless coordination component 410 and the supervisory component 408 to analyze the data packet characteristics and determine if a collision is imminent or likely to occur in the interference region 140 or within the first and second access areas 114, 124. For example, if it is determined that a collision between the frequency-overlapping protocols is imminent or likely to occur, then the signal processing component 406 may utilize at least one of the wireless coordination component 410 and the supervisory component 408 to coordinate the timing of the packet transmissions to avoid or significantly reduce the occurrence of a packet collision. Advantageously, the coordination of data and packet transmissions in the wireless network 100 increases the efficiency and throughput of the wireless information exchange protocols in a manner that promotes ease of use and simplicity of implementation.

Similarly, the signal processing component 406 may utilize at least one of the backbone coordination component 412 and the supervisory component 408 to prioritize the exchange of information including packet transmissions between the wireless communication devices 110, 112, 120, 122 and the backbone network 130. In one aspect, the backbone coordination component 412 is configured to analyze the packet characteristics of backbone designated data packets and determine if a collision is imminent or likely to occur in the interference region 140 or within the first and second access areas 114, 124. Furthermore, the backbone coordination component 412 may be utilized by the supervisory component 408 to convert wireless packet transmission signals into a backbone recognizable packet signal for the purpose of transmitting information from the wireless devices 110, 112, 120, 122 in the access areas 114, 124 to the backbone network 130.

It should be appreciated that the ACP devices 200, 300, 320, 350 may be deployed in a multiple station access area similar to the wireless network 100, wherein the ACP devices 200, 300, 320, 350 may comprise a modified Bluetooth unit and a modified WLAN unit. In one aspect, the ACP devices 200, 300, 320, 350 may be positioned among conventional wireless communication devices in the multiple station access area. The advantage of this network configuration and architecture is that the preexisting wireless communication devices in the multiple station access area may remain intact and unmodified while benefiting from conflicting protocol moderation through the use of at least one of the ACP devices 200, 300, 320, 350. The addition and utilization of at least one of the aforementioned ACP devices 200, 300, 320, 350 in the multiple station access area desirably improves wireless transmission performance and through which may be achieved by monitoring, managing, and/or coordinating wireless information exchange through data and packet signal transmissions.

Figure 4:
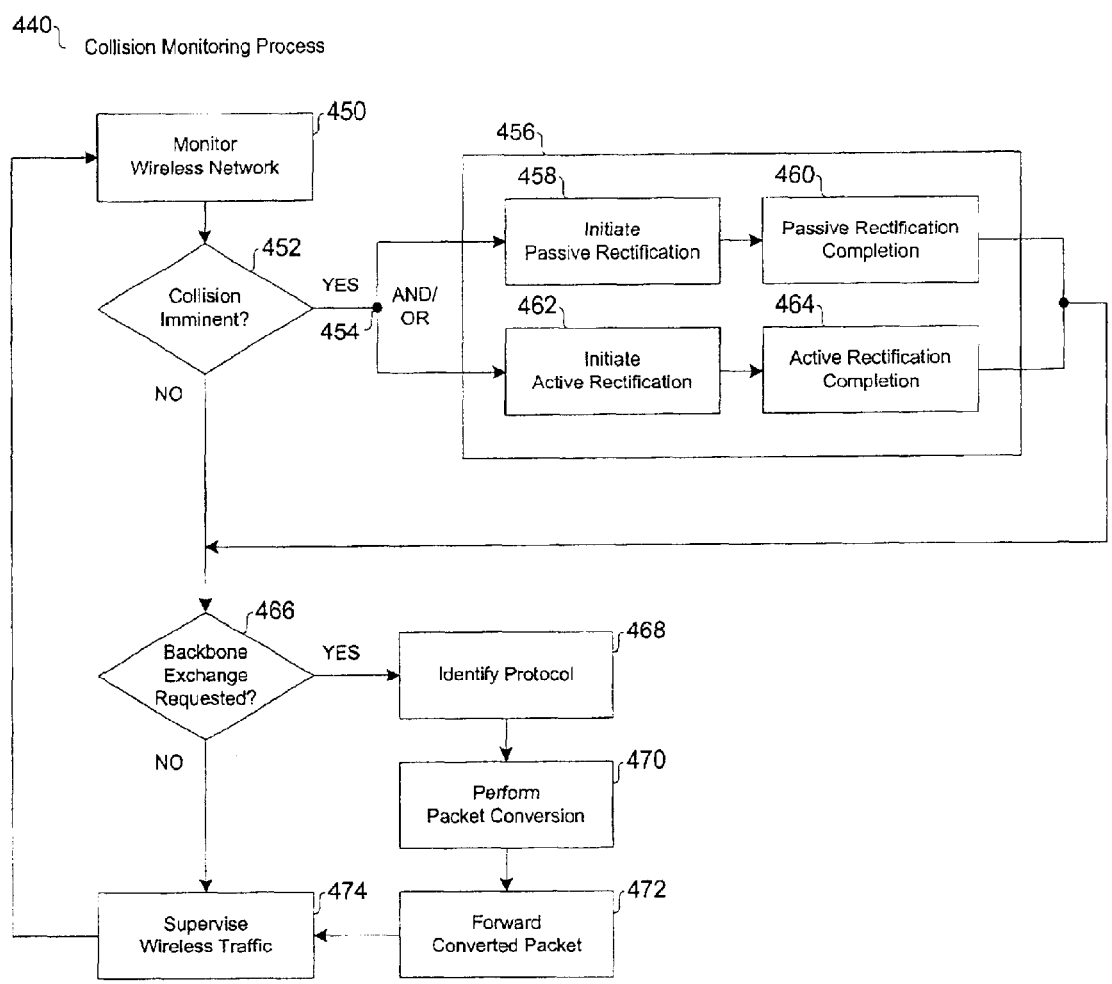
FIG. 4 illustrates one embodiment of a collision avoidance process that may be used by the-above-mentioned ACP devices to moderate the exchange of information in the wireless network.

FIG. 4 illustrates one embodiment of a collision avoidance process 450 that may be used by the ACP devices 200, 300, 320, 350 to monitor, moderate, and coordinate the exchange of information in the wireless network 100. To begin, the collision monitoring process 440 may commence in a state 450 where the ACP device 200 monitors the wireless network 100 and receives transmission information indicative of previously and currently transmitted characteristics of communication signals 116, 126, which may comprise data and/or information packets.

In one aspect, the transmission characteristics may be obtained by monitoring packet transmission traffic in the wireless network 100. More specifically, the ACP device 200 may poll or "listen" to information contained in the wireless transmissions made by both BT wireless devices 110, 112 and WLAN wireless devices 120, 122 to identify the transmission characteristics that relate to how data packets are being transmitted. These transmission characteristics include information as to the order or arrangement of data packets, the timing of transmission of the data packets, and the frequency or channel that the data packets will be transmitted on. To simplify the following discussion of the collision monitoring process 440, the ACP device 200 will be used, but it should be appreciated that the following discussion may be applied to one or more of the previously described ACP devices 200, 300, 320, 350 without departing from the scope of the present invention.

Upon receiving the transmission characteristics, the ACP device 200 may determine in a first decision state 452 if a collision between the frequency-overlapping protocols is imminent or likely to occur. If the data traffic in the wireless network is determined by the ACP device 200 to not be subject to concurrent transmissions which might cause interference, then the process 440 advances to a second decision state 466, and the ACP device 200 does not necessarily interrupt the data traffic in the access areas 114, 124 and permits BT wireless devices and WLAN wireless devices to send information without moderation. If however, a data collision or protocol interference is anticipated or detected in the first decision state 452, then the ACP device 200 may proceed through a series of collision avoidance measures in a state 456, which may be designed to redirect wireless traffic in such a manner so as to prevent or reduce the occurrence of collision signals or interference in the wireless network 100.

In the state 456, collision avoidance may commence with the ACP device 200 making a determination as to how to modify current and subsequent packet ordering to reduce or eliminate the anticipated or detected data collision. In one aspect, the ACP device 200 may select or be configured to operate with a passive rectification process and/or for an active rectification process at the process node 454. In a state 458, the ACP device 200 may perform passive rectification. Passive rectification may include previously described packet deferment methods, packet jamming methods, timing map generation methods, and packet dropping methods. In a state 460, the passive rectification method is completed and the process 440 advances to the second decision state 466.

Additionally, the ACP device 200 may perform active rectification in a state 462. Active rectification includes a signal separation method as described in the Applicant's U.S. provisional applications entitled "RECOGNITION SCHEME FOR MODERATING WIRELESS PROTOCOLS" Ser. No. 60/328,882 and Ser. No. 60/367,664, which are hereby incorporated by reference in their entirety. In one embodiment, a signal separation operation or process may be used to resolve a received collision signal into a first and second component signal. The signal processing component may utilize the signal separation process to match by comparison modeled waveform components of a derived collision model to the transferred waveform components of the received collision signal in a probability decision based on the processing method, the channel condition, and the transmitter/receiver performance. In addition, the ACP device 200 may implement the signal separation process by utilizing a generated collision model to resolve the first and second component signals from the received collision signal. Advantageously, the signal separation process may be used by the ACP device 200 in the wireless network 100 to reduce interference and data corruption resulting from the simultaneous transmission of the first and second component signals in the wireless network 100. Once the collision signal is separated into its components and the signal separation method is completed in the state 464, the process 440 advances to the second decision state 466.

In the second decision state 466, the ACP device 200 analyzes the currently transmitted communication signals 116, 126, which may include the packet header characteristics, to determine if the wireless devices 110, 112, 120, 122 have requested information exchange with the backbone network 130. In this particular case, if the ACP device 200 determines that a backbone request has been made, then the ACP device 200 identifies the protocol used to encode the packet in a state 468, performs a packet conversion in a state 470, and forwards or transfers the converted packet to the backbone network in a state 472. Otherwise, if a backbone exchange request has not been made in the state 466, then the process 440 advances to a state 474. In one aspect, packet conversion comprises operations associated with transforming data received in a wireless protocol or format into data which is compatible with and may be desirably distributed through the backbone network. For example, packet conversion 470 of Bluetooth or WLAN associated data or information packets may comprise transforming the packetized information of these protocol into TCP compatible packetized information (i.e. BSC sockets-based protocol compatible information). Therefore, the ACP device 200 desirably functions as a gateway which permits connectivity between the wireless networks which is used to coordinate traffic and networks and devices located outside of the wireless network. As such, the ACP possess both a wireless coordination functionality and a network conectivity functionality.

Since the ACP device 200 may comprise dual monitoring and transmitting functionality, the ACP device 200 may receive and decode/demodulate a plurality of protocols, such as BT and WLAN protocols. Therefore, in the state 468, the ACP device 200 is capable of determining the protocol type. Once the protocol type is determined in the state 468, the ACP device performs a packet conversion in the state 470. In one aspect, packet conversion may require transforming or encoding the packet data or information from the wireless protocol, such as a BT or WLAN wireless protocol, into a recognizable backbone network protocol, such as a TCP (transmission control protocol) or other backbone or network protocol. Once the desired packet conversion is performed in the state 470, the ACP device 200 forwards or allows the converted packet to be forwarded to the backbone network 130 for a resultant exchange of information. The collision avoidance process then advances to a state 474 where the ACP device supervises the exchange of information in the wireless network 100, including packet transmission traffic via the communication signals 116, 126 in the access areas 114, 124.

In the state 474, the ACP device 200 may supervise the BT wireless devices 110, 112 by functioning as a BT master in a manner as previously described. Additionally, the ACP device 200 may supervise the exchange of information between the WLAN devices 120, 122 by functioning as a WLAN AP device also in a manner as previously described. At this point, the collision avoidance process 440 may then loop back to monitor the wireless network 100 in the state 450.

In an another embodiment, the ACP device 200 may further comprise hardware that may be used to buffer or queue the data packets to permit the temporary storage of data packets. The ACP device 200 may additionally use information contained in the buffer or queue to determine ahead-of-time or future timing arrangements to avoid potentially interfering data transmissions in the wireless network. The ACP device 200 may further make use of the buffer or queue along with decoded data packet information to determine the timing and ordering in which packets should be transmitted so as not to interfere with other data packets that are currently in a state of transmission in the wireless network. For example, as new packets are received by the ACP device 200, the portion of the data packet corresponding to header information may be decoded. The header contains transmission information such as timing and frequency of transmission characteristics which can be readily used by ACP device 200 to schedule buffered or queued data so as to prevent overlapping data transmissions.

There are many advantages associated with utilizing the above-mentioned ACP devices 200, 300, 320, 350 in conjunction with the collision avoidance process 440. Advantageously, the ACP devices may comprise a centralized control point and be integrated into an existing wireless network with mixed protocols and topologies to increase data throughput by reducing conflicting data transmissions using frequency-overlapping protocols. In addition, modifications to existing access or control points may be performed and the traffic evaluation and coordination functions utilized to improve load balancing and frequency sharing functionality across multiple frequency-overlapping protocols. Moreover, the feature of the independent ACP devices may increase the flexibility, functionality, and/or stability of a wireless network and the associated wireless communication devices. Advantageously, the integrated ACP devices may substantially improve the flexibility of wireless network design by reducing limitations imposed by existing wireless devices. Furthermore, the coordination of data and packet transmissions in a wireless network may significantly increase the efficiency and throughput of the wireless information exchange protocols in a manner that promotes ease of use and simplicity of implementation.

Although the above description exemplifies some embodiments of the present invention, it should be understood that various omissions, substitutions, and changes in the form of the detail of the apparatus, system, and/or method as illustrated as well as the uses thereof, may be made by those skilled in the art, without departing from the spirit of the present invention. Consequently, the scope of the present invention should not be limited to the disclosed embodiments, but should be defined by the appended claims, which hereby subsequently follow.

What is claimed is:

1. A communications system in a wireless network having a first access area with a first plurality of wireless communication devices and a second access area with a second plurality of wireless communication devices, the system comprising:

an interference region in the wireless network, wherein the first access area overlaps the second access area, and wherein the first plurality of wireless communication devices that exchange communication signals using a first frequency-overlapping protocol coexist with the second plurality of wireless communication devices that exchange communication signals using a second frequency-overlapping protocol; and an add-in control point positioned within the wireless network, wherein the add-in control point monitors and coordinates the exchange of communication signals between the first and second frequency-overlapping protocols to reduce collisions between the communication signals derived from the first and second frequency-overlapping protocols, wherein the add-in control point analyzes the timing statistics of the communication signals to identify each type of frequency-overlapping protocol in use and determines a quality of service parameter for each type of frequency-overlapping protocol used.

2. A communications system in a wireless network having a first access area with a first plurality of wireless communication devices and a second access area with a second plurality of wireless communication devices, the system comprising:

an interference region in the wireless network, wherein the first access area overlaps the second access area, and wherein the first plurality of wireless communication devices that exchange communication signals using a first frequency-overlapping protocol coexist with the second plurality of wireless communication devices that exchange communication signals using a second frequency-overlapping protocol; and an add-in control point positioned within the wireless network, wherein the add-in control point monitors and coordinates the exchange of communication signals between the first and second frequency-overlapping protocols to reduce collisions between the communication signals derived from the first and second frequency-overlapping protocols, wherein the add-in control point is connected to a backbone network and comprises an access control point, wherein the access control point permits the add-in control point to manage the exchange of communication signals between the first and second plurality of wireless communication devices and the backbone network.

3. A communications system in a wireless network having a first access area and a second access area, the system comprising:

a first plurality of wireless communication devices positioned within the first access area, wherein the first plurality of wireless communication devices exchange information by transceiving a first plurality of frequency-overlapping wireless communication signals;

a second plurality of wireless communication devices positioned within the second access area, wherein the second plurality of wireless communication devices exchange information by transceiving a second plurality of frequency-overlapping wireless communication signals;

an overlapping area in the wireless network, wherein the first and second access areas overlap, and wherein the first plurality of frequency-overlapping wireless communication signals derived from the first plurality of communication devices using the first protocol coexist with the second plurality of frequency-overlapping wireless communication signals derived from the second plurality of communication devices using the second protocol; and a collision avoidance device positioned in the wireless network, wherein the collision avoidance device monitors the first and second plurality of frequency-overlapping wireless communication signals and coordinates the exchange of the first and second plurality of frequency-overlapping wireless communication signals to reduce the occurrence of collisions between the first and second plurality of frequency-overlapping wireless communication signals, wherein the collision avoidance device analyzes the timing statistics of the first and second frequency-overlapping wireless communication signals to identify the type of frequency-overlapping protocol used and determines a quality of service parameter for the type of frequency-overlapping protocol used.

4. A communications system in a wireless network having a first access area and a second access area, the system comprising:

a first plurality of wireless communication devices positioned within the first access area, wherein the first plurality of wireless communication devices exchange information by transceiving a first plurality of frequency-overlapping wireless communication signals;

a second plurality of wireless communication devices positioned within the second access area, wherein the second plurality of wireless communication devices exchange information by transceiving a second plurality of frequency-overlapping wireless communication signals;

an overlapping area in the wireless network, wherein the first and second access areas overlap, and wherein the first plurality of frequency-overlapping wireless communication signals derived from the first plurality of communication devices using the first protocol coexist with the second plurality of frequency-overlapping wireless communication signals derived from the second plurality of communication devices using the second protocol; and a collision avoidance device positioned in the wireless network and connected to a backbone network, wherein the collision avoidance device monitors the first and second plurality of frequency-overlapping wireless communication signals and coordinates the exchange of the first and second plurality of frequency-overlapping wireless communication signals to reduce the occurrence of collisions between the first and second plurality of frequency-overlapping wireless communication signals;

wherein the collision avoidance device comprises an access control point that is connected to the backbone network, wherein the access control point permits the collision avoidance device to manage the exchange of communication signals between the first and second plurality of wireless communication devices and the backbone network.

5. A communications system in a wireless network having at least two access areas and a backbone network, the system comprising:

a plurality of wireless communication devices positioned throughout the at least two access areas, wherein the plurality of wireless communication devices operate using a plurality of frequency-overlapping wireless communication protocols;

an interference region in the wireless network, wherein the at least two access areas overlap, and wherein the plurality of wireless communication devices coexist and exchange wireless communication signals using the plurality of frequency-overlapping wireless communication protocols; and an interference moderation device positioned adjacent to the at least two access areas, wherein the interference moderation device monitors and coordinates the exchange of communication signals between the plurality of wireless communication devices to reduce collisions between the plurality of frequency-overlapping wireless communication protocols, and wherein the interference moderation device monitors and coordinates the exchange of communication signals between the plurality of wireless communication devices and the backbone network, wherein the interference moderation device analyzes the timing statistics of the communication signals to identify the type of frequency-overlapping wireless communication protocol used and determines a quality of service parameter for the type of frequency-overlapping wireless communication protocol used.

6. A communications system in a wireless network having at least two access areas and a backbone network, the system comprising:

a plurality of wireless communication devices positioned throughout the at least two access areas, wherein the plurality of wireless communication devices operate using a plurality of frequency-overlapping wireless communication protocols;

an interference region in the wireless network, wherein the at least two access areas overlap, and wherein the plurality of wireless communication devices coexist and exchange wireless communication signals using the plurality of frequency-overlapping wireless communication protocols; and an interference moderation device positioned adjacent to the at least two access areas, wherein the interference moderation device monitors and coordinates the exchange of communication signals between the plurality of wireless communication devices to reduce collisions between the plurality of frequency-overlapping wireless communication protocols, and wherein the interference moderation device monitors and coordinates the exchange of communication signals between the plurality of wireless communication devices and the backbone network, wherein the interference moderation device comprises an access control point that is connected to the backbone network, wherein the access control point permits the interference moderation device to manage the exchange of communication signals between the plurality of wireless communication devices and the backbone network.

* * * * *